US012562189B2

(12) United States Patent
Ma et al.

(10) Patent No.: US 12,562,189 B2
(45) Date of Patent: Feb. 24, 2026

(54) DISK DRIVE ARM ACTUATOR WITH PIEZOELECTRIC ULTRASONIC MOTOR

(71) Applicant: Seagate Technology LLC, Fremont, CA (US)

(72) Inventors: Yichao Ma, Singapore (SG); Xiong Liu, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 28 days.

(21) Appl. No.: 18/756,148

(22) Filed: Jun. 27, 2024

(65) Prior Publication Data

US 2026/0004807 A1     Jan. 1, 2026

(51) Int. Cl.
| | |
|---|---|
| *G11B 5/55* | (2006.01) |
| *G11B 5/48* | (2006.01) |
| *G11B 21/08* | (2006.01) |

(52) U.S. Cl.
CPC .......... *G11B 5/5521* (2013.01); *G11B 5/4813* (2013.01); *G11B 5/4833* (2013.01); *G11B 5/5578* (2013.01); *G11B 21/08* (2013.01); *G11B 5/4873* (2013.01)

(58) Field of Classification Search
None
See application file for complete search history.

(56) References Cited

U.S. PATENT DOCUMENTS

| | | | |
|---|---|---|---|
| 4,755,705 | A | 7/1988 | Holum |
| 4,905,107 | A | 2/1990 | Klein |
| 5,136,201 | A | 8/1992 | Culp |
| 5,144,187 | A | 9/1992 | Culp |
| 5,521,778 | A | 5/1996 | Boutaghou et al. |
| 5,682,076 | A | 10/1997 | Zumeris |
| 6,088,194 | A | 7/2000 | Imaino et al. |
| 6,356,404 | B1 | 3/2002 | Nguyen |
| 6,384,514 | B1 | 5/2002 | Slutskiy et al. |
| 6,987,637 | B2 | 1/2006 | Litvinov et al. |
| 7,072,147 | B2 | 7/2006 | Limmer et al. |
| 7,131,346 | B1 * | 11/2006 | Buttar et al. ........... G11B 27/36 360/294.4 |
| 7,298,593 | B2 | 11/2007 | Yao et al. |
| 7,834,516 | B2 | 11/2010 | Kang et al. |
| 8,797,664 | B1 | 8/2014 | Guo et al. |
| 9,106,158 | B2 | 8/2015 | Hübner et al. |
| 9,361,919 | B1 | 6/2016 | Lieu et al. |

(Continued)

*Primary Examiner* — Craig A. Renner
(74) *Attorney, Agent, or Firm* — Westman, Champlin & Koehler, P.A.

(57) ABSTRACT

A data storage device includes a stack of data storage disks, a head stack assembly, and a piezoelectric motor. The head stack assembly includes an arm, a load beam, a head and a tail. The arm is configured for pivotal motion about a longitudinal axis of an actuator shaft. The load beam is attached to the arm. The head is attached to the load beam and is configured to interact with a surface of one of the disks, the surface defining an x-y plane. The tail is disposed on an opposite side of the actuator shaft from the arm and has a first engagement surface that is parallel to the x-y plane. The piezoelectric motor includes a piezoelectric element and a contact tip. The piezoelectric element comprises a first mounting surface. The contact tip is disposed at the first mounting surface and frictionally contacts the engagement surface.

20 Claims, 11 Drawing Sheets

(56)          References Cited

U.S. PATENT DOCUMENTS

| | | | |
|---|---|---|---|
| 10,249,339 B1 | 4/2019 | Mendonsa et al. | |
| 10,269,380 B1 | 4/2019 | Sun et al. | |
| 10,818,317 B1 | 10/2020 | Erden et al. | |
| 11,031,037 B1 | 6/2021 | Garbarino | |
| 11,218,089 B2 | 1/2022 | Koc et al. | |
| 11,348,611 B1 | 5/2022 | Mendonsa et al. | |
| 11,443,763 B1 | 9/2022 | Ma et al. | |
| 11,468,909 B1 | 10/2022 | Liang et al. | |
| 11,727,957 B1 | 8/2023 | Ma et al. | |
| 2002/0049104 A1* | 4/2002 | Ito | G11B 5/5521 |
| | | | 474/70 |
| 2002/0149884 A1 | 10/2002 | Price et al. | |
| 2003/0128456 A1* | 7/2003 | Shitara et al. | G11B 5/5552 |
| | | | 360/77.07 |
| 2005/0236934 A1 | 10/2005 | Koganezawa et al. | |
| 2008/0174901 A1* | 7/2008 | Tanimura et al. | G11B 5/5521 |
| | | | 360/72.1 |
| 2008/0297002 A1* | 12/2008 | Oki et al. | G11B 5/5569 |
| | | | 310/323.16 |
| 2009/0015098 A1* | 1/2009 | Matsuo | G11B 5/5569 |
| | | | 369/215.1 |
| 2023/0198429 A1 | 6/2023 | Born et al. | |

* cited by examiner

DISK DRIVE ARM ACTUATOR WITH PIEZOELECTRIC ULTRASONIC MOTOR

SUMMARY

In one embodiment, a data storage device comprises a stack of data storage disks mounted on a spindle, a first head stack assembly, and a first piezoelectric motor. The stack of data storage disks comprises a first plurality of disks. The first head stack assembly comprises a first arm, a first load beam, a first head and a first tail. The first arm is configured for pivotal motion about a longitudinal axis of an actuator shaft. The first load beam is attached to the first arm. The first head is attached to the first load beam, wherein the first head is configured to interact with a surface of one of the first plurality of disks, the surface defining an x-y plane. The first tail is disposed on an opposite side of the actuator shaft from the first arm, and the first tail has a first engagement surface that is parallel to the x-y plane. The first piezoelectric motor comprises a first piezoelectric element and a first contact tip. The first piezoelectric element comprises a first mounting surface. The first contact tip is disposed at the first mounting surface, wherein the first contact tip is configured to frictionally contact the first engagement surface to pivot the first head stack assembly about the longitudinal axis.

This summary and the Abstract are provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

Figure 1:
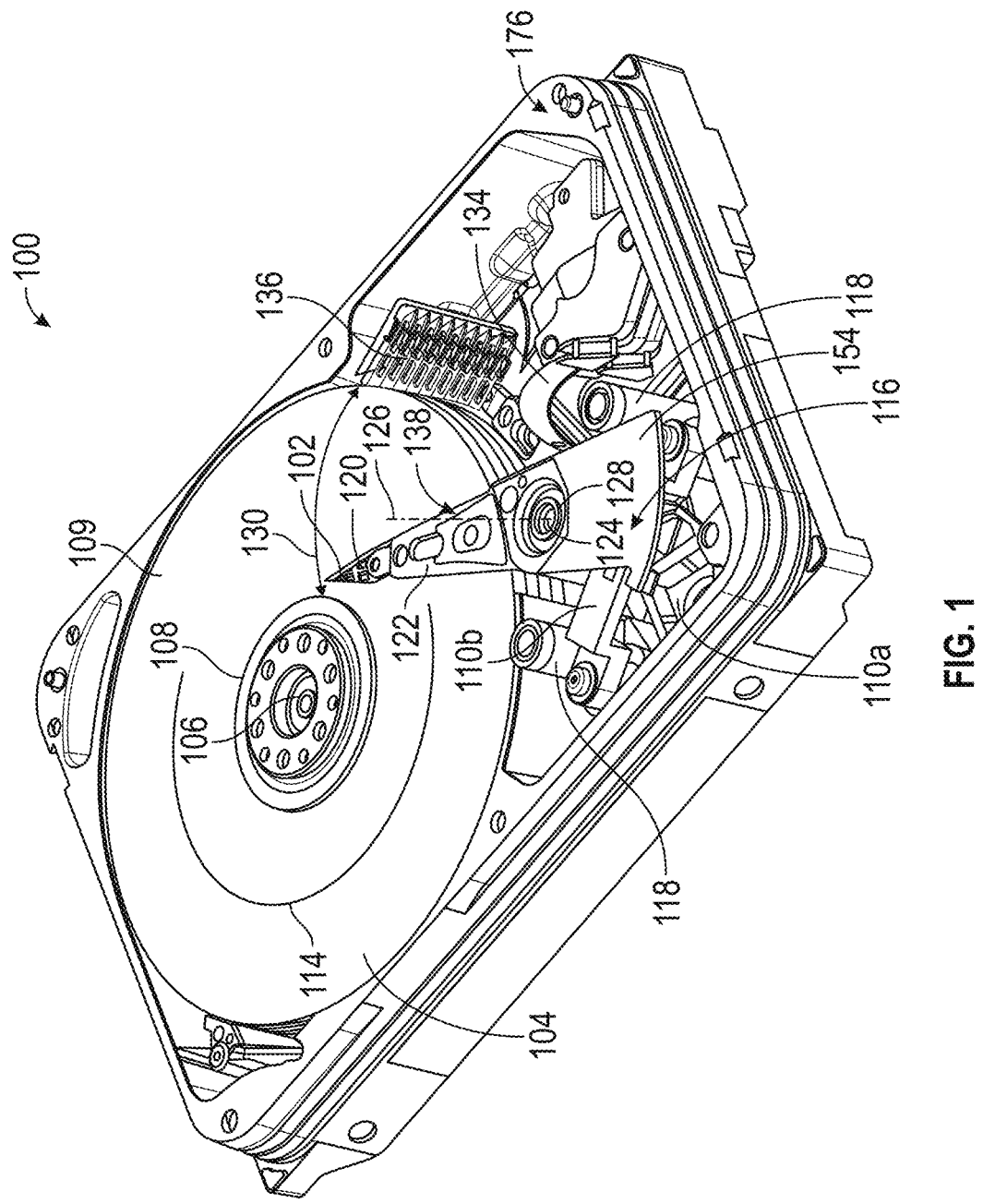
FIG. 1 is a perspective view of an exemplary data storage device with its top cover removed.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for case of understanding the description. It is contemplated that structures may be oriented otherwise.

DETAILED DESCRIPTION

The present disclosure generally relates to data storage devices that utilize magnetic storage media, such as hard disks. A common known hard disk drive (HDD) has a single pivot actuator that is either attached to multiple actuator arms via an E-block or attached to a single actuator arm that is movable by an elevator. Having only a single pivot actuator can lead to slow performance due to the time taken to move the head assembly from disk to disk. Thus, some systems use more than one pivot assembly for a single stack of disks, such as in a dual actuator hard disk (DAHD) drive having two stacked pivoting actuator arm assemblies, each having an E-block. The dual actuators allow for higher performance (increased operation speeds) and higher reliability. However, DAHDs with two pivot actuators configured as voice coil motors (VCM) have relatively high power consumption, heat generation, cost, size, mass and assembly complexity.

The storage capacity of hard disk drives has steadily increased due to an increase in areal density provided by such technological advances as perpendicular recording, shingled magnetic recording (SMR), heat-assisted magnetic recording (HAMR), interleaved magnetic recording (IMR), microwave-assisted magnetic recording (MAMR), and helium filling, for example. One way to address the need for greater HDD performance is to utilize multiple read/write heads 102 in parallel. Such parallelism can increase the rate of input/output operations (IOPS) and thereby speed up certain operations. Use of simultaneously operating read/write heads can provide other options; for example, a HDD can be configured with zones having different levels of throughput and capacity, and multiple heads can be operated in different modes to improve throughput in some zones while improving capacity (or other performance parameter) in others.

In embodiments described below, a hard disk drive includes multiple heads driven by separate actuators. In some cases, the multiple heads can read from and/or write to one or more disks simultaneously. Simultaneously active heads can be used to increase data rate or for other purposes (such as to increase reliability or service different requests in parallel, for example). The signal processing circuitry of the drive may include parallel processing paths. For example, the processing circuitry may include multiple read/write channels for processing (e.g., decoding and/or encoding) user and control data. The processing circuitry may also include multiple servo control logic sections that allow data from each reader to be used for servo control of the head or heads in which the readers are embedded. This servo logic also provides timing signals used by the signal processing logic.

Additional information relevant to high performance of a disk drive is provided in the following commonly owned patents, which are hereby incorporated by reference: U.S. Pat. No. 6,356,404 for "Simultaneously biasing multiple magneto-resistive read elements;" U.S. Pat. No. 6,987,637 for "Magnetic recording system which eliminates skew angle effect;" U.S. Pat. No. 7,072,147 for "Hard drive actuator arm with reduced skew variation;" U.S. Pat. No. 9,361,919 for "Disk drive with parallel head actuation;" U.S. Pat. No. 10,249,339 for "Read-after-write methodology using multiple actuators moveable over the same magnetic media;" U.S. Pat. No. 10,818,317 for "Multi-actuator data system;" and U.S. Pat. No. 11,468,909 for "Zero skew with ultrasonic piezoelectric swing suspension."

FIG. 1 shows an illustrative operating environment in which certain embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

An illustrated embodiment in FIGS. 1-5 of a data storage device (DSD) 100 in the form of a HDD shows two piezoelectric ultrasonic motors 110 (USMs): an outer USM 110a and an inner USM 110b. Thus, two specific embodiments of a piezoelectric USM are described, and in some cases they will be differentiated by referring to the first embodiment with reference number 110a and the second embodiment with reference to number 110b. However, in many aspects, the USMs are similar; descriptions of motor 110, 110a or 110b apply to all embodiments unless otherwise specified. This convention also applies to other similarly numbered elements.

It should be understood that the illustrated data storage device 100 is exemplary, and teachings of the disclosure can be applied to a different data storage device having only a single piezoelectric ultrasonic motor 110 for pivoting a single actuator arm assembly, for example. The single actuator arm assembly can be attached via an E-block 112 to multiple actuator arms 122 carrying multiple heads 102. Alternatively, such a USM 110 can be used to actuate a single actuator arm that is operably connected to an elevator to allow the single actuator arm to access any disk surface of a stack of data disks.

In the particularly illustrated embodiments of the disclosure, multiple head stack assemblies (HSA's) are used to increase performance; space savings are realized by providing the multiple head stack assemblies on the same longitudinal pivot axis 126, such as defined by a single shared magnetic shaft 124. In an exemplary embodiment, each of the two HSA's 138 has independent E-blocks 112 that rotate to move the connected actuator arms 122 on and off the disk stack. For example, in a 10-disk stack, one head stack assembly 138a reads and writes relative to the top 5 disks, and the second head stack assembly 138b reads and writes relative to the bottom 5 disks.

In general, in order to keep read/write heads from landing on one or more disks 104 in a hard disk drive 100 when, for example, power is removed from the HDD 100, and to prevent the heads 102 from colliding with outer edges of the disks during load and unload operations, a head-support ramp 136 is provided adjacent to an outer diameter (OD) 109 of the disk(s) 104. In some HDDs, a number of heads 102 is equal to a number of effective disk surfaces, and the heads 102 are moved on rotating actuator arms 122 for positioning over or under their corresponding disk surfaces. There is typically no up/down movement of the heads in such HDDs. However, in an "elevator" drive, for example, the number of heads employed is less than the number of disk surfaces, and a head stack assembly (HSA) including the fewer number of heads is moved up and down to enable a single head or head pair to read from multiple disk surfaces. Suitable elevator configurations include, for example, those described in the following commonly owned patent, which is hereby incorporated by reference: U.S. Pat. No. 10,269,380 for "Disk drive having multiple disks accessible by a reduced number of read/write heads."

It should be noted that the same reference numerals are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a schematic illustration of a data storage device (DSD) 100. In housing 176, heads 102 may be positioned over and/or under storage media 104 to read data from and/or write data to the data storage media 104. In the embodiment shown in FIG. 1, the data storage media 104 are rotatable data storage disks stacked on spindle 106, with each disk 104 having opposing surfaces that serve as data storage surfaces. For read and write operations, a spindle motor rotates the media 104 and dual actuator mechanisms 110 position the heads 102 relative to data tracks 114 on the rotating media 104 between an inner diameter (ID) 108 and an outer diameter (OD) 109. Both the spindle motor and actuator mechanisms 110 are connected to and operated through drive circuitry.

In general, in order to keep read/write heads 102 from landing on disks 104 in a data storage device 100 when, for example, power is removed from the data storage device 100, and to prevent the heads 102 from colliding with outer edges of the disks 104 during load and unload operations, a head support ramp assembly 136 is provided adjacent to the OD 109 of the disks 104.

Each of heads 102 is coupled to its respective actuator mechanism 110 through an E-block 112 carrying multiple actuator arms 122 and respective load beams 120. The E-block 112 is rotationally coupled to housing 176 by a pivot bearing 128 on a pivot shaft 124 to rotate about the longitudinal axis 126 of shaft 124. The actuator mechanism 110 moves the heads 102 in a cross-track direction as illustrated by arrow 130. Each of the heads 102 includes one or more transducer elements (not shown) coupled to head circuitry through flex circuit 134.

In the illustrated embodiments, the outer USM 110a moves the upper head stack assembly (HSA) 138a, and the inner USM 110b moves the lower head stack assembly 138b. However, those of skill in the art will recognize that other configurations are possible. Each HSA 138a,b may be moved independently of the other HSA 138a,b under the motive of the two independent actuators 110. Actuator 110a controls the rotation of top HSA 138a about the axis 126 of the pivot shaft 124. Actuator 110b controls, independently, the rotation of the bottom HSA 138b about the same pivotal axis 126 of the shaft 124, which in an exemplary embodiment extends vertically through both head stack assemblies 138.

While the illustrated system has two head stack assemblies 138, it is contemplated that the teachings described herein can be applied to a disk stack including any number of disks stacked on a single spindle 105 and any number of head stack assemblies 138 arranged on one or more shafts 124 (or multiple linearly aligned shaft sections). Moreover, a DSD may have head stack assemblies arranged on opposed sides of a disk stack or otherwise.

Figure 2:
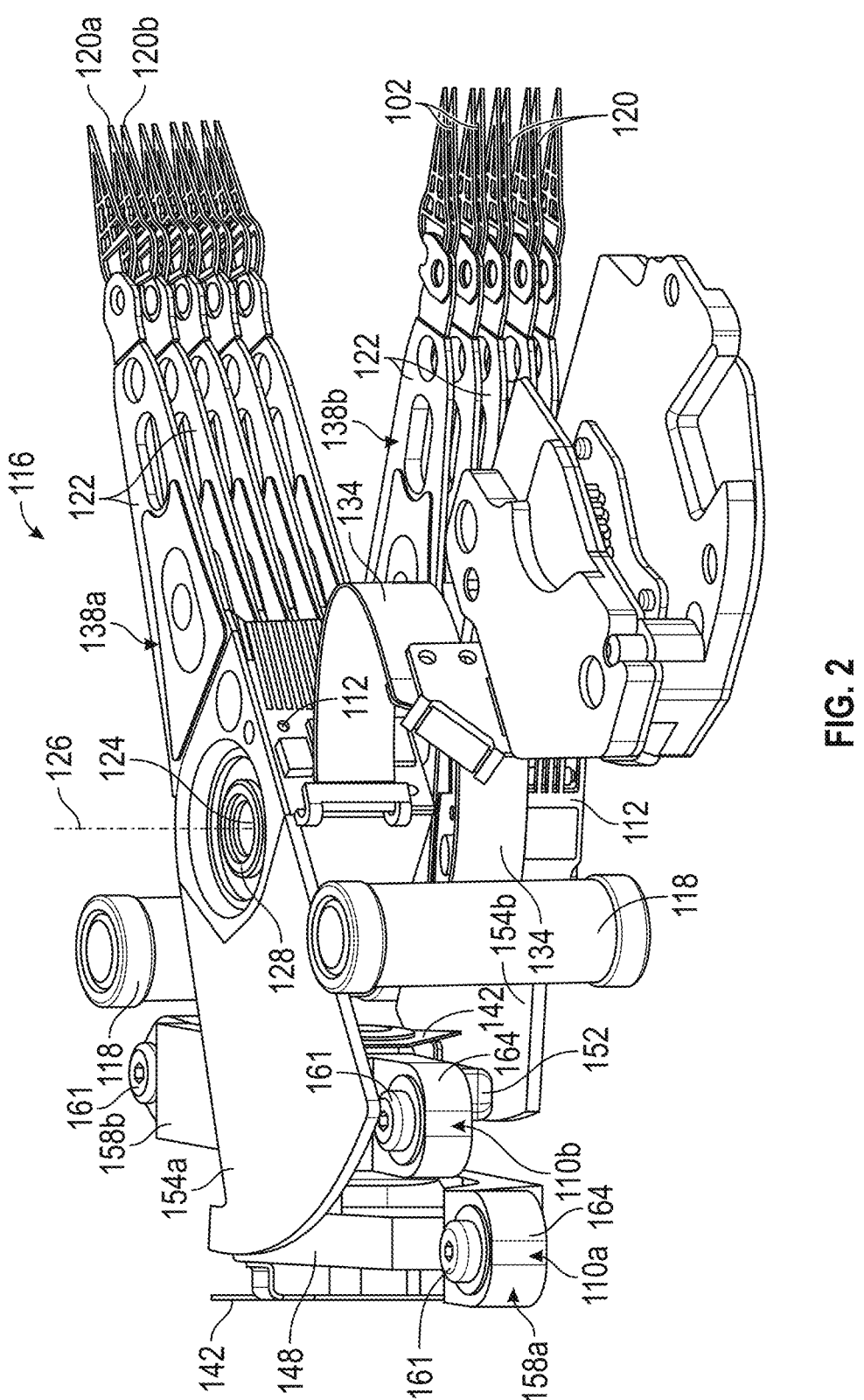
FIG. 2 is a perspective view of an exemplary dual actuator assembly of the data storage device.
Figure 4A:
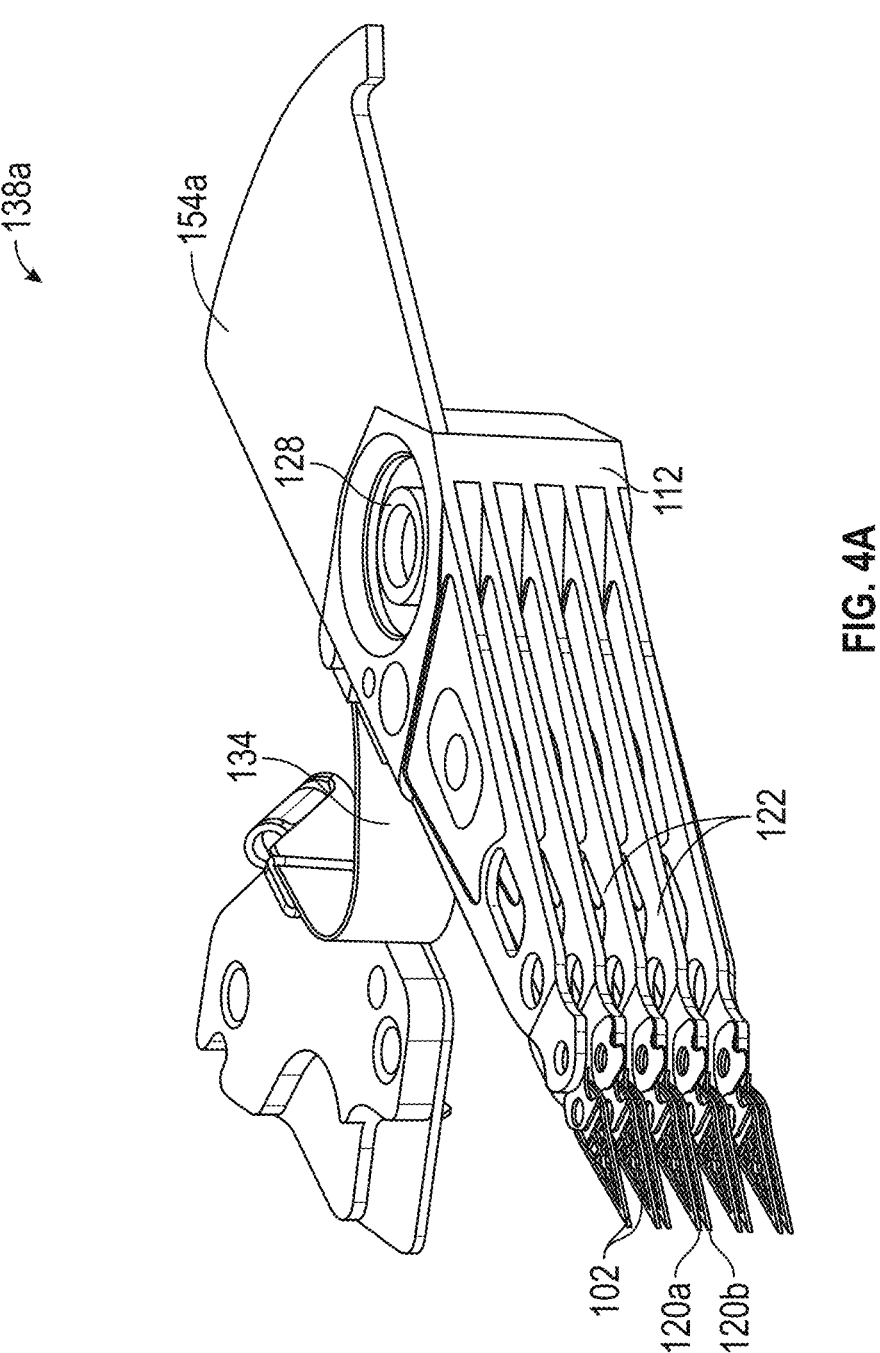
FIG. 4A is a perspective view of an exemplary upper head stack assembly.
Figure 4B:
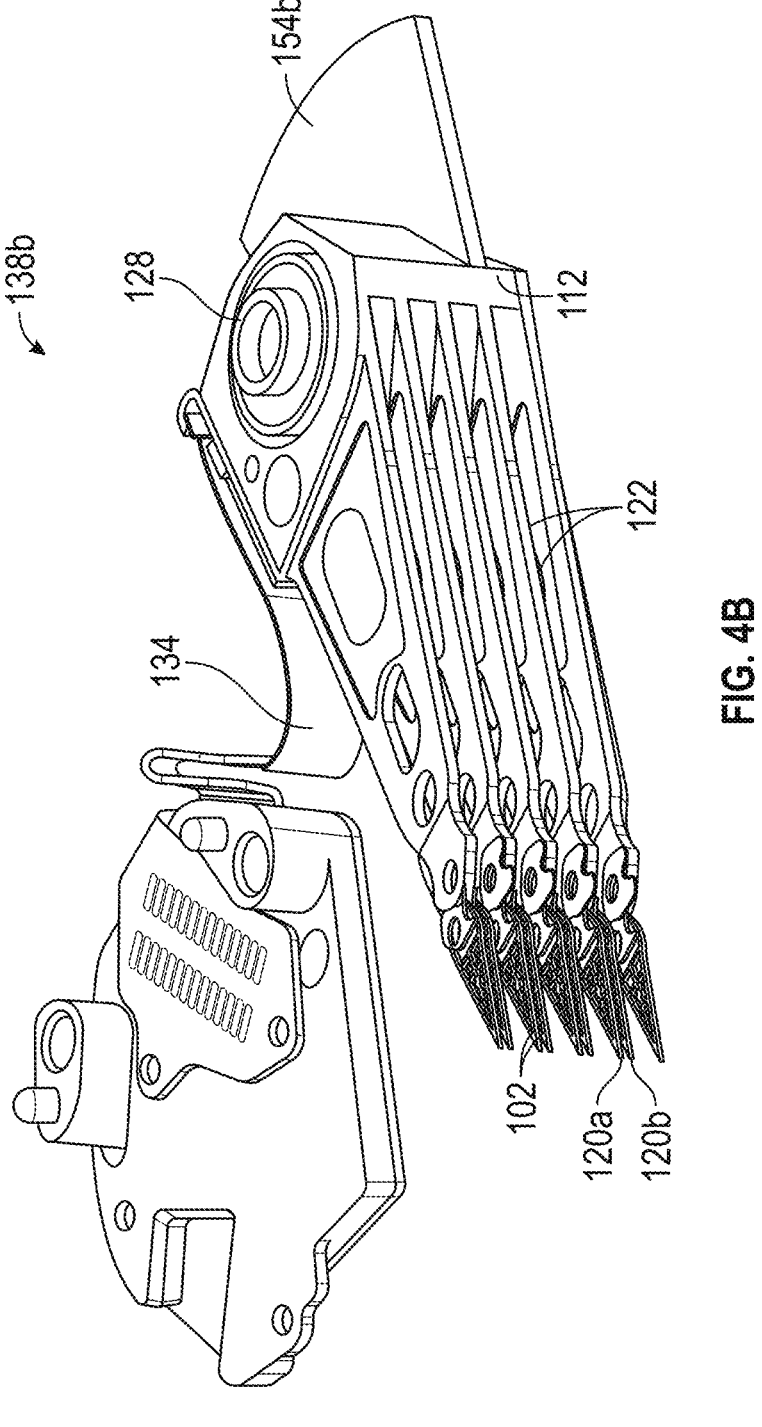
FIG. 4B is a perspective view of an exemplary lower head stack assembly.

As shown in FIGS. 2, 4A and 4B, in some cases, an actuator arm 122 includes upper and lower load beam portions 120a, 120b respectively attached to the head end of actuator arm 122. The load beam portions 120a, 102b carry heads for reading and writing on top and bottom surfaces of a disk 104. A lift tab extends from each load beam 120, 120a, 120b to rest on the head support ramp assembly 136 when the disk drive storage device 100 is in an off or non-operating state.

For use of heads 102 for reading and writing data relative to disk 104, a selected actuator 110 is activated to rotate the E-block 112 about pivot axis 126 of shaft 124, to thereby move the head end of HSA 138 off of the head support ramp assembly 136 and to the disk 104. The pivot shaft 124 can be provided as a single, unitary elongated element. Alternatively, each of the head stack assemblies 138a and 138b could have its own shaft 124, in which case the separate shafts would be aligned end to end along the same axis 126. Each of the HSA's 138 operates separately and concurrently to perform read, write and seek tasks so that the performance of the hard disk drive can be approximately double that of a drive having only a single actuator and arm assembly.

FIG. 2 shows some components of the exemplary arm actuator system removed from the base housing 176 of the DSD 100. In an exemplary embodiment, an actuator assembly 116 includes an outer USM 110a that actuates an upper HSA 138a and an inner USM 110b that actuates a lower HSA 138b. Two crash stops 118 are positioned to physically contact side surfaces of HSA tails 154 to limit the rotational motion of the tails 154 and thus the rigidly attached E-blocks 112 and arms 122 of the HSA's 138a, 138b about the pivot axis 126. When each HSA 138 rotates between the two crash stops 118, the head end of the HSA 138 is maintained between the inner diameter 108 and the outer diameter 109 of the disks 104.

Figure 3:
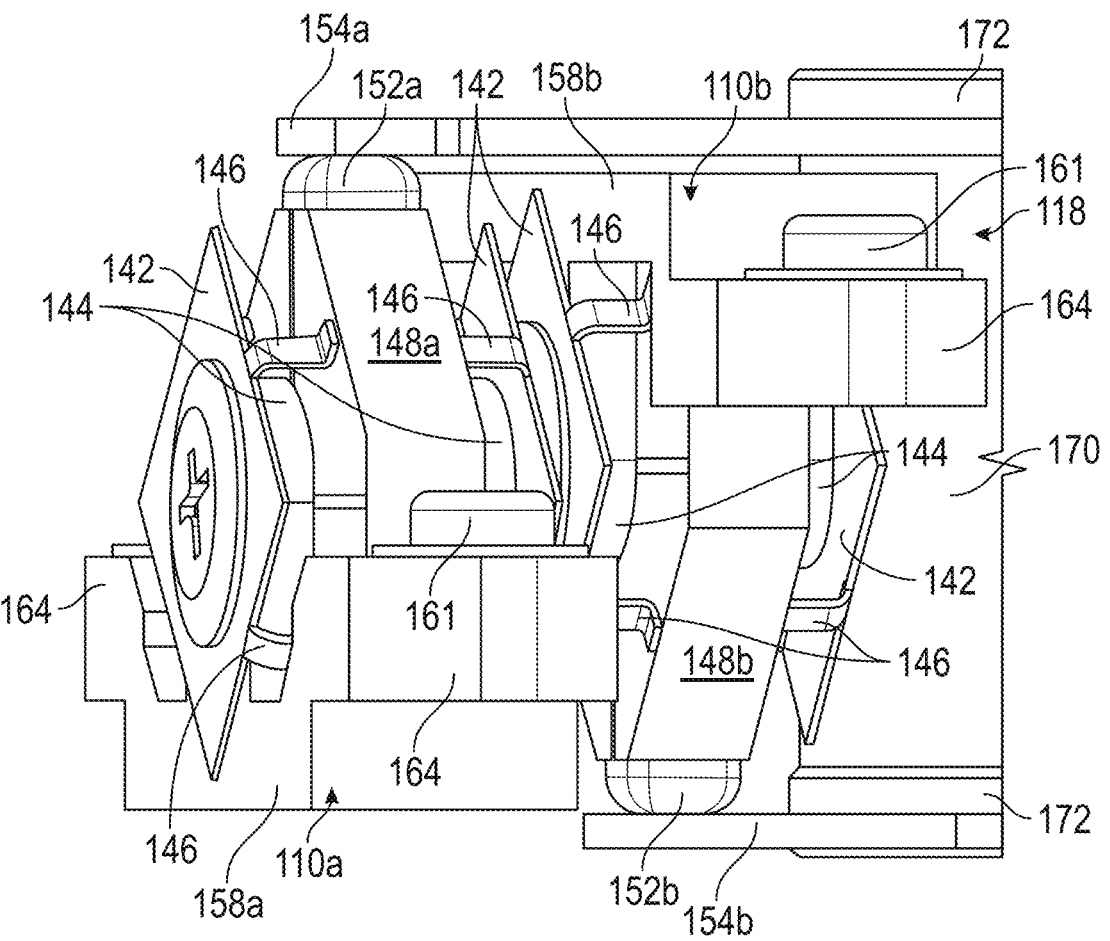
FIG. 3 is a partial perspective view showing the piezoelectric ultrasonic motors of the assembly of FIG. 2.

FIG. 3 is a side elevation view of a portion of the assembly 116 of FIG. 2, showing frictional engagement between a bottom surface of HSA tail 154a and contact tip 152a of the outer USM 110a. Similarly, though in an upside-down orientation, the top surface of HSA tail 154b is frictionally engaged by the contact tip 152b of inner USM 110b. In an exemplary embodiment, HSA tail 154a is positioned at a top of the upper HSA 138a, and HSA tail 154b is positioned at a bottom of the lower HSA 138b. These locations prevent physical interference between the moving tails 154 and other structures of the USM's 100 and allow for the structures to be contained in a small space.

In an exemplary embodiment, each of the USM's 110 includes a piezoelectric element 148 supported in a framework that includes opposed plates 142 attached on both sides of the piezoelectric element 148 by a central support 144 and biasing elements such as steel springs 146 positioned about the periphery of the piezoelectric element 148. In an exemplary embodiment, each central support 144 is an elastic member that does not interfere with shape deformation of the piezoelectric element 148. Moreover, a contact area of the steel springs 146 is minimized to reduce potential interference with changes in shape of the piezoelectric element 148. The steel springs 146 serve to center the piezoelectric element 148 within the framework. Moreover, the steel springs 146 also create a reaction force between the contact tip 152 and the engagement surface of the respective HSA tail 154, thereby generating a friction force that allows the piezoelectric element 148 to move the HSA tail 154. In exemplary embodiments, each HSA tail 154 is configured as a horizontal plate, though other configurations are possible. Further, HSA 138 is fastened in the DSD 100 to provide a load force that opposes the spring reaction force.

Figure 5:
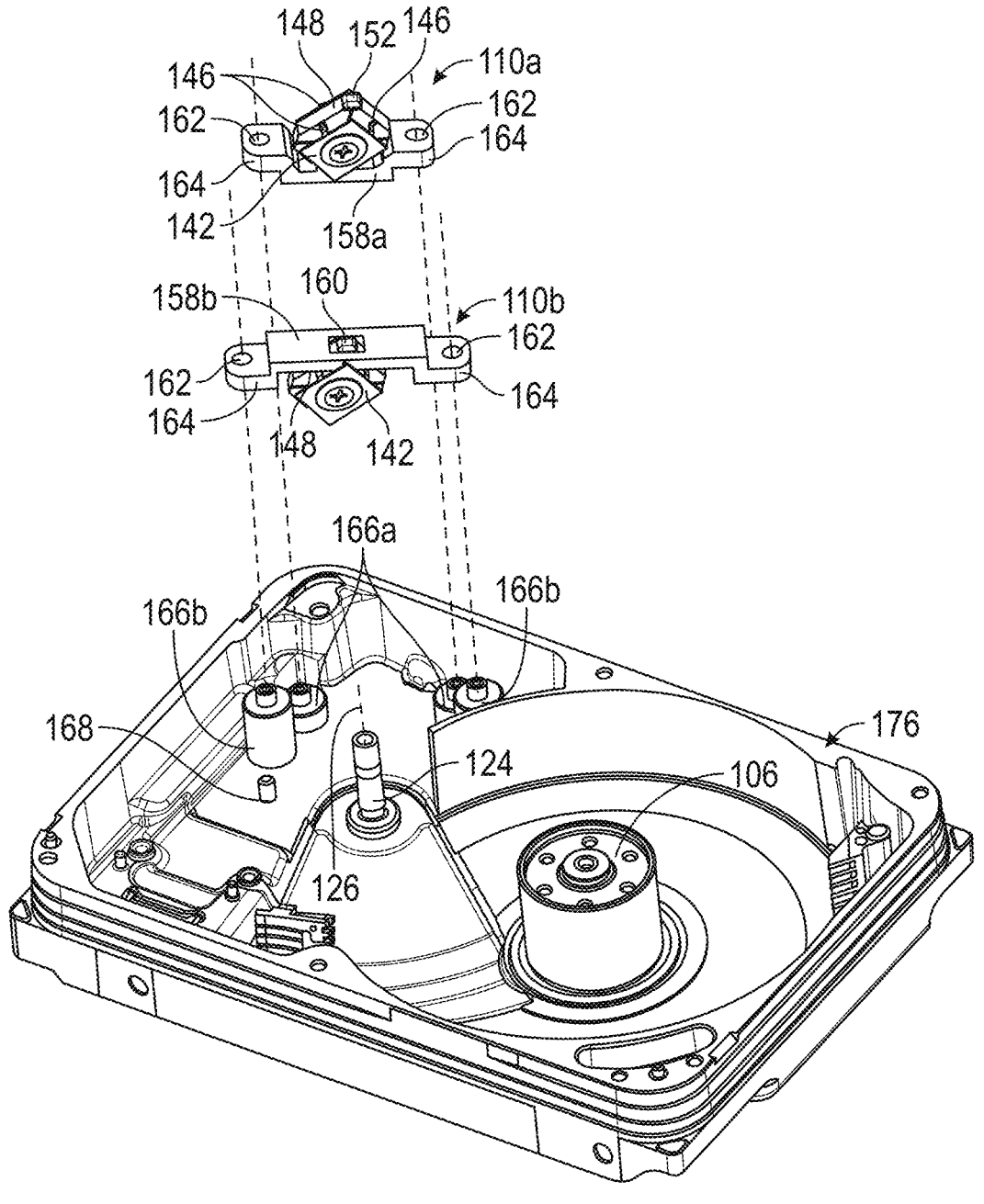
FIG. 5 is an exploded view showing the data storage device housing and the two piezoelectric ultrasonic motors.

In an exemplary embodiment, the two opposed plates 142 of a USM 110 are attached to opposite sides of base 158. Referring to FIG. 5, in an exemplary embodiment, each base 158 has a central opening 160 therein to accommodate a corner of the piezoelectric element 148 that is opposite the contact tip 152. Fastener apertures 162 in corresponding flanges 164 are configured to align with posts 166 for attachment to a base housing 176 of the DSD 100 via fasteners 161. As shown in FIGS. 2 and 3, the inner and outer USM's are designed to engage the top and bottom HSA tails separately. Referring to FIGS. 2 and 3, the engagement location (at contact tip 152a) of the outer USM 100a with the top HSA tail 154a is farther (as a radial distance) from the longitudinal axis 126 than a location of the engagement (at contact tip 152*b*) of the inner USM 110*b* with the lower HSA tail 154*b*. Thus, the top HSA 138*a* has a higher toque due to the larger driving radius.

As shown in FIG. 5, because the outer USM 110*a* is positioned closer to the corner of the DSD housing 176, its base 158*a* is shorter than that of the inner USM 110*b*, and there is a shorter distance between the fastener apertures 162. Base 158*b*, in addition to being longer than base 158*a*, is also positioned at an upper portion of the piezoelectric element 148 so that it does not interfere with motion of the lower HSA tail 154*b*.

Figure 6:
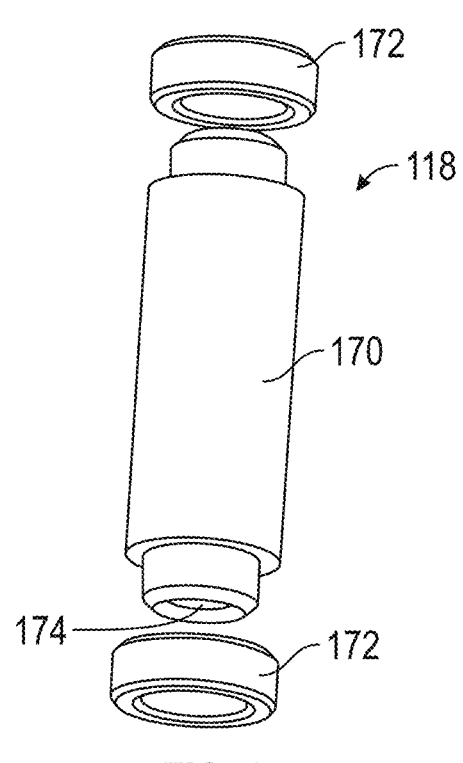
FIG. 6 is an exploded view of an exemplary crash stop.

Also visible in FIG. 5 is a stud 168 for locating crash stop 118. FIG. 6 is an exploded perspective view of an exemplary crash stop 118, which includes a pin 170 with two resilient rings 172, such as formed of rubber, configured to be positioned at the top and bottom ends of the pin 170. For assembly, a bottom resilient ring 172 is placed around the stud 168. Recess 174 of pin 170 is positioned onto the stud 168 and into the bottom resilient ring 172. The top resilient ring 172 is placed on the top of pin 170, and the crash stop assembly is maintained by a cover (not shown) configured to be placed over the illustrated DSD housing 176.

Figure 7:
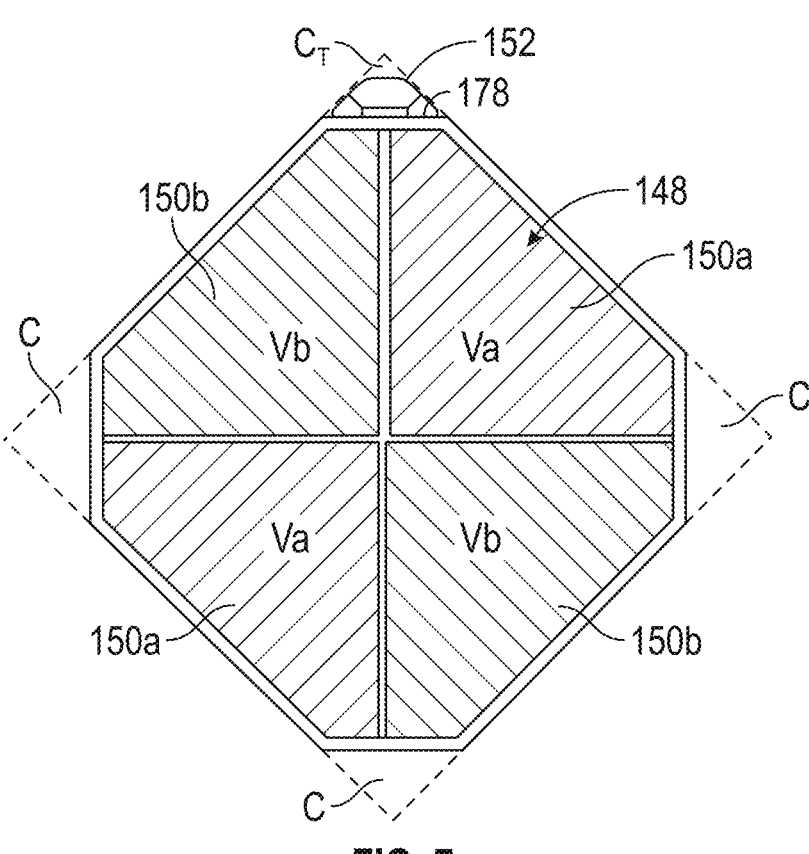
FIG. 7 is a schematic view of an exemplary piezoelectric element of the ultrasonic motor.
Figures 8A, 8B, 8C:
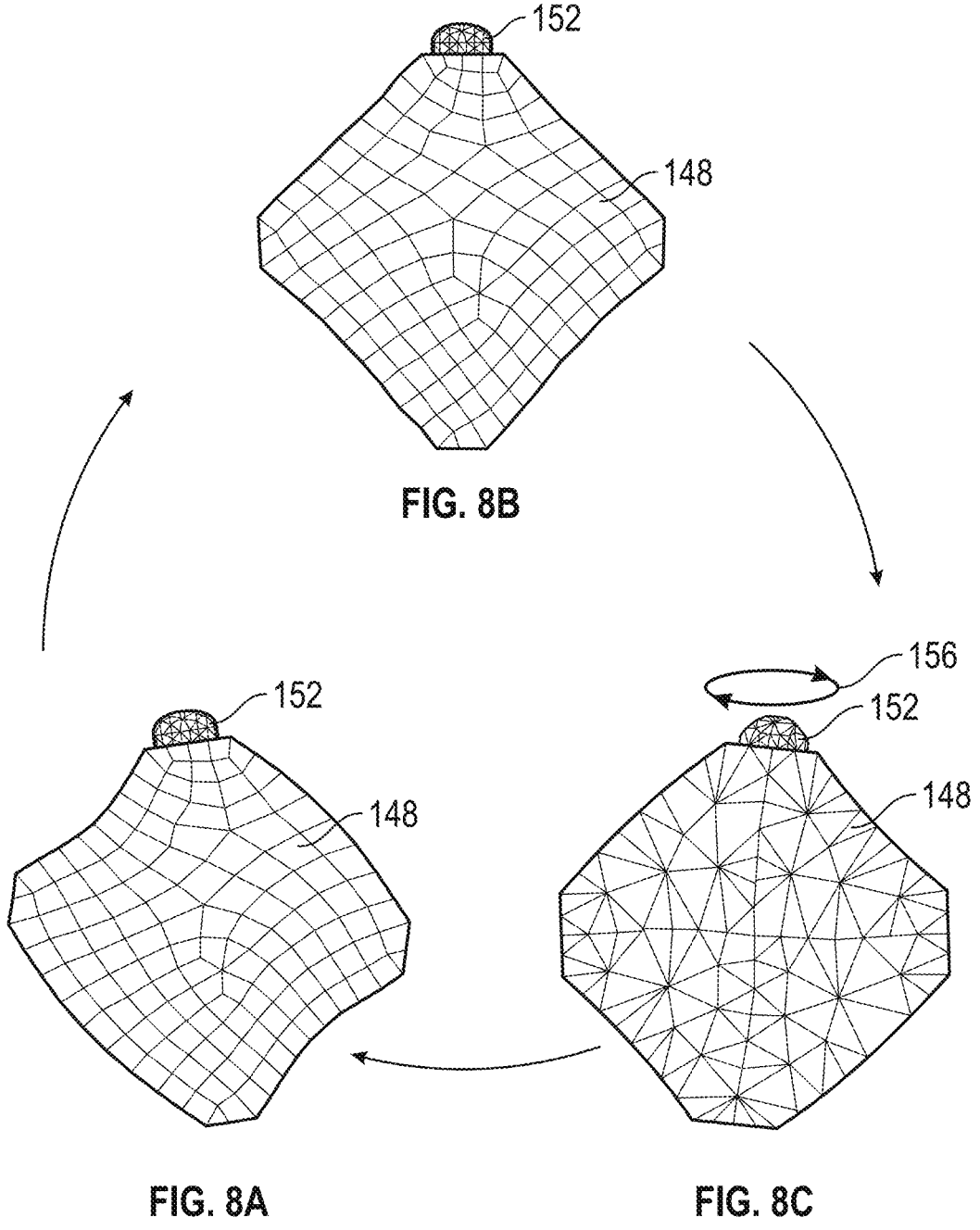
FIG. 8A illustrates a bending mode of the ultrasonic motor.
FIG. 8B illustrates an expanding mode of the ultrasonic motor.
FIG. 8C illustrates the elliptical motion of the contact tip achieved by alternating between the bending and expanding modes.

As shown in FIGS. 7-8C, in an exemplary embodiment, contact tip 152 is provided on piezoelectric element 148 to frictionally engage HSA tail 154 of HSA 138. With reference to the cycle of FIGS. 8A-8C and the structure of FIG. 3, through such frictional engagement, and with the elliptical motions of contact tip 152 against HSA tail 154, the actuation of the piezoelectric element 148 moves the respective HSA tail 154 in rotary directions about pivot axis 126, to thereby swing the actuator arms 122 of the respective HSA 138 to move the attached heads 102 in the cross-track direction 130. In some embodiments, HSA tail 154 can include features that assist in this frictional engagement, such as a knurled or otherwise textured surface. In the illustrated embodiments, HSA tails 154 are configured as fan-shaped plates of the respective HSA 138.

In an exemplary embodiment as shown in FIG. 7, piezoelectric element 148 has four exciter electrodes 150. In the exemplary diamond structure, FIG. 8A illustrates a bending mode and FIG. 8B illustrates an expanding or stretching mode. FIGS. 8A-8C are schematic illustrations of a vibration mode of operation of the piezoelectric element 148 in a cycle. In an exemplary embodiment, the actuation is based on excitation of the piezoelectric element 148 in a resonance mode of a two-dimensional standing extension wave. In an exemplary embodiment, two sine wave voltage excitations are applied (such as Va and Vb diagonally to the set of electrodes 150*a* or the set of electrodes 150*b*) with a 90 degree phase difference. Both excitation modes (bending and expanding) can be enabled by providing an alternative voltage having an operating frequency of approximately Va or Vb. The maximum speed of the USM 110 is attained when both resonance modes (bending and expanding) share the same frequency.

In the illustrated cycle, the piezoelectric element 148 will bend and expand, thereby vibrating in a bimodal resonant manner. The bending mode ($f_b$) of FIG. 8A generally causes a contact tip 152 positioned on mounting surface 178 to move in a side-to-side motion as illustrated. The expanding mode ($f_e$) of FIG. 8B generally causes contact tip 152 to move in an up-and-down motion as illustrated. Together, the combination of the two resonance modes (bending and expanding at the same resonance frequency) causes contact tip 152 to follow an elliptical path 156, as shown in FIG. 8C. The illustration of motion of the contact tip 152 is exaggerated for case of understanding. Actuation of the piezoelectric element 148 results in the contact tip 152 moving along an elliptical trajectory 156 against the HSA tail 154 of a respective HSA 138. The direction of motion will be reversed by switching the direction of the phase angle difference of the sine wave voltage (i.e., changing the polarity of the voltage).

Referring to FIG. 7, for a diamond shape piezoelectric element 148, Δf, which equals $f_e$–$f_b$, is a function of chamfer C; f is the natural frequency corresponding to the normal modes. Hence, $f_e$ is the natural frequency of the expanding mode, and $f_b$ is the natural frequency of the bending mode. Chamfer C refers to the volume of material removed from the main body of piezoelectric element 148, such as to form projections having mounting surface 178 for contact tip 152. At tip 152, the chamfer is designated $C_T$. When C=0, Δf>0. As C increases, $f_b$ increases more, while $f_e$ increases less. Δf=0 for a specific C; thus, with a proper amount of material removed from the main body of piezoelectric element 148, the difference between the frequency of the expanding mode and the bending mode can be reduced or even eliminated.

Figure 9:
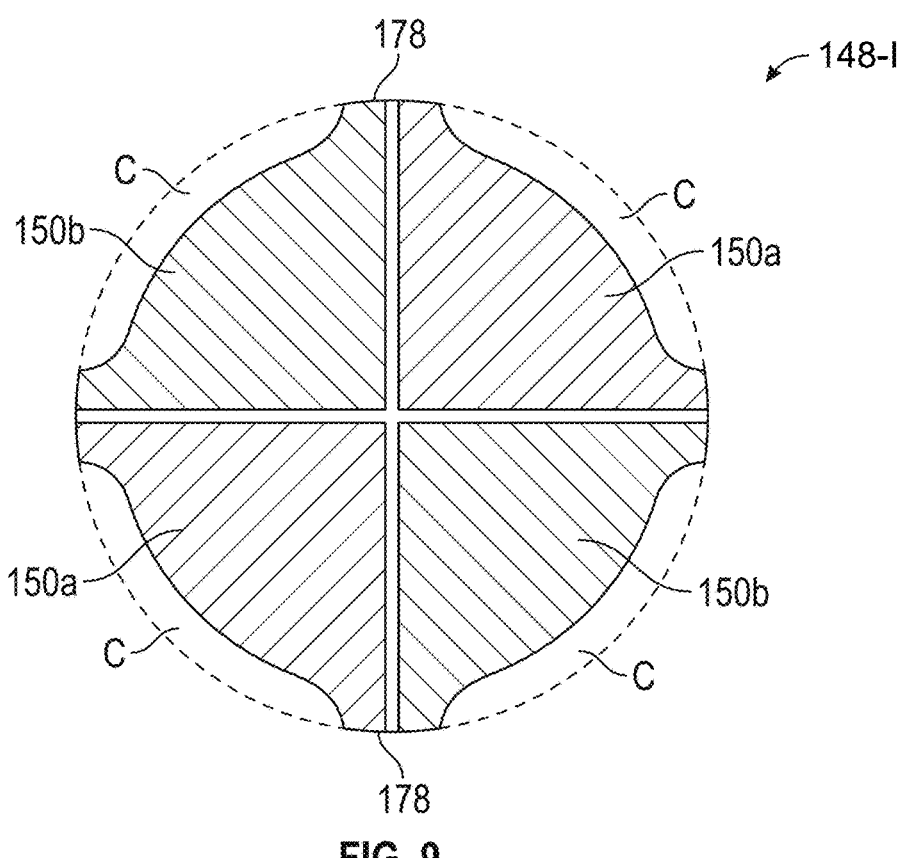
FIG. 9 is a schematic view of an exemplary circular piezoelectric element of an ultrasonic motor.
Figure 10:
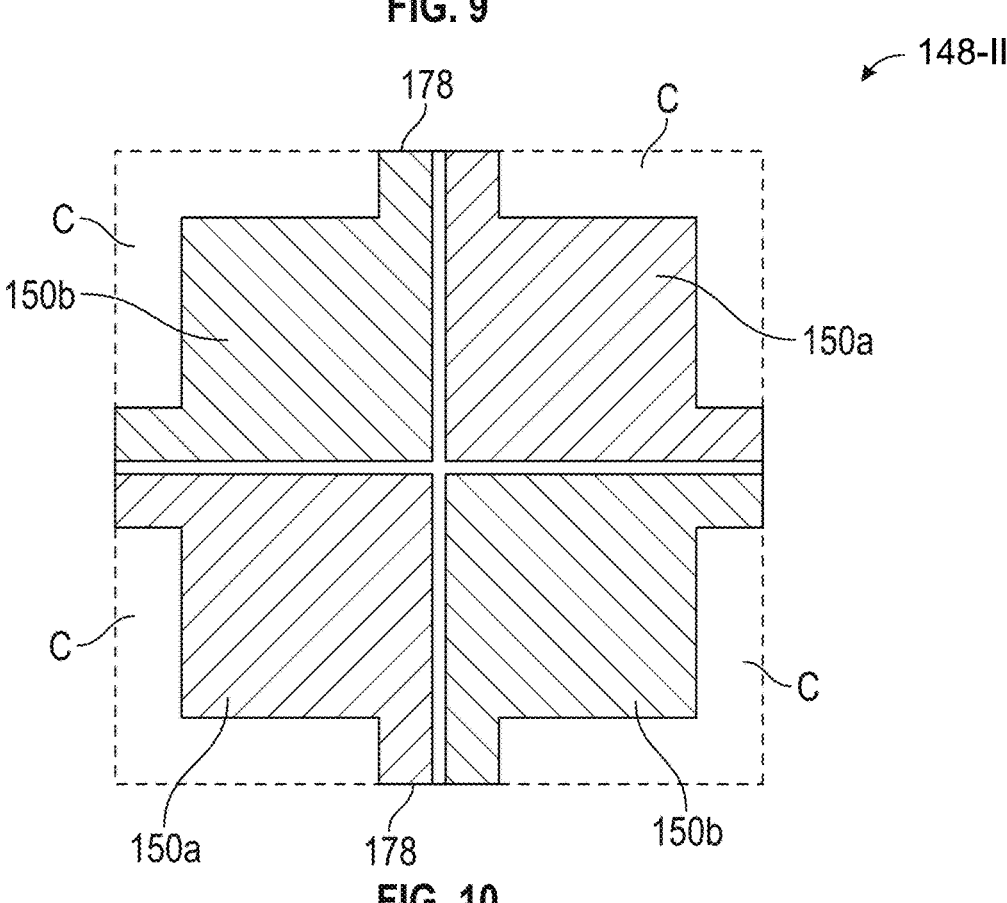
FIG. 10 is a schematic view of an exemplary square piezoelectric element of an ultrasonic motor.

Referring to FIG. 9, a circular piezoelectric element 148-I is also particularly suitable for USM 110, as it has a symmetrical structure for which matching the resonance frequencies for the bending and expanding modes is straightforward. Referring to FIG. 10, a square piezoelectric element 148-II is also particularly suitable for USM 110, as it has a symmetrical structure for which matching the resonance frequencies for the bending and expanding modes is straightforward.

Figure 11:
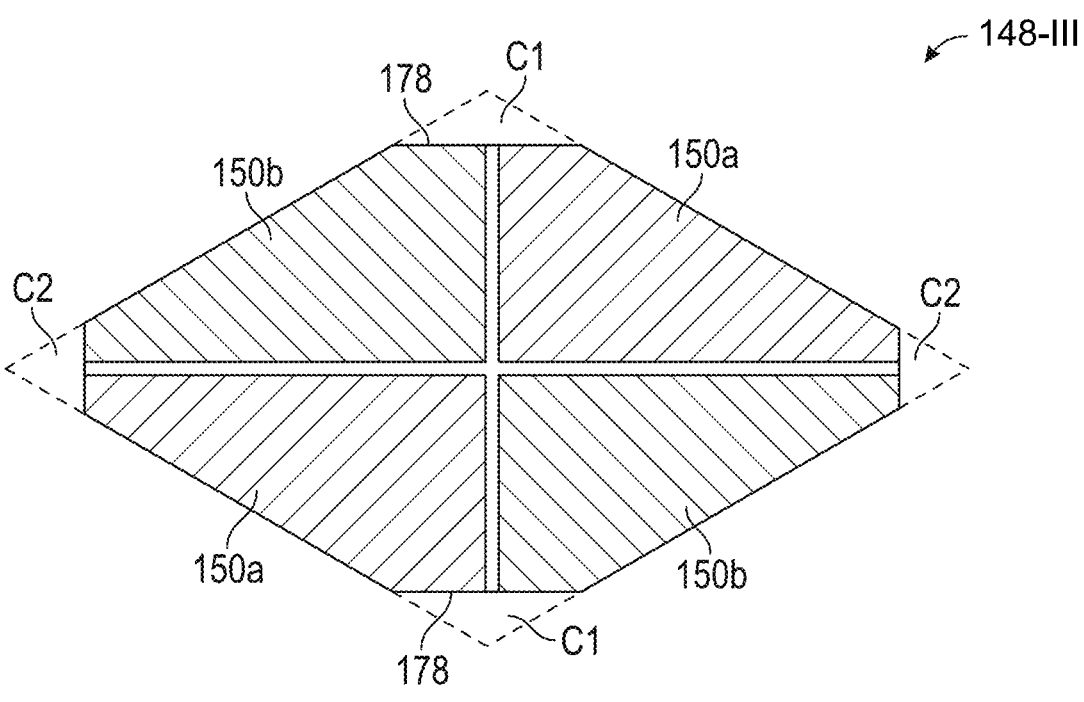
FIG. 11 is a schematic view of an exemplary rhombus piezoelectric element of an ultrasonic motor.
Figure 12:
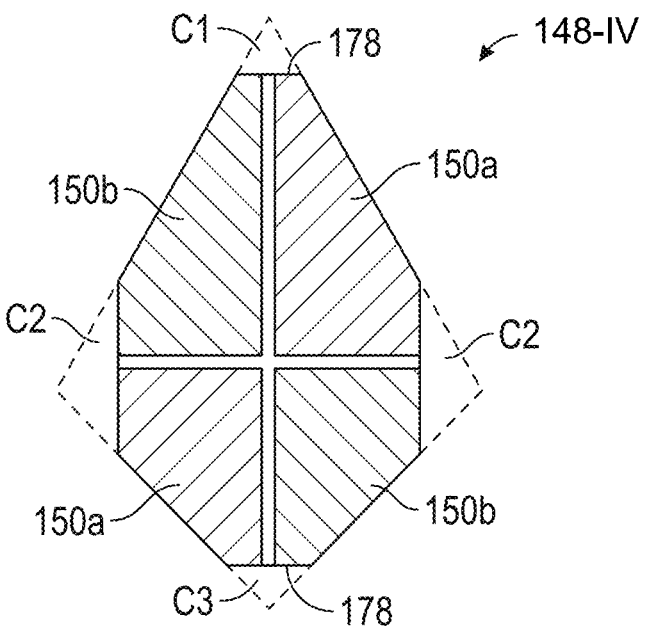
FIG. 12 is a schematic view of an exemplary first kite piezoelectric element of an ultrasonic motor.
Figure 13:
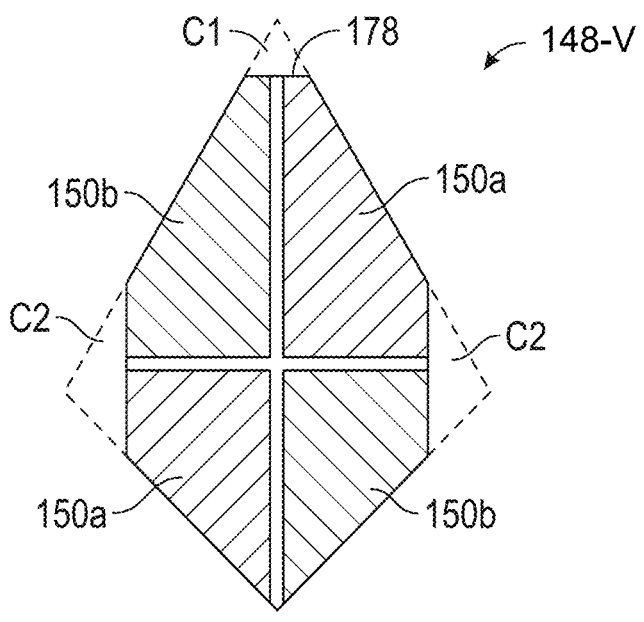
FIG. 13 is a schematic view of an exemplary second kite piezoelectric element of an ultrasonic motor.
Figure 14:
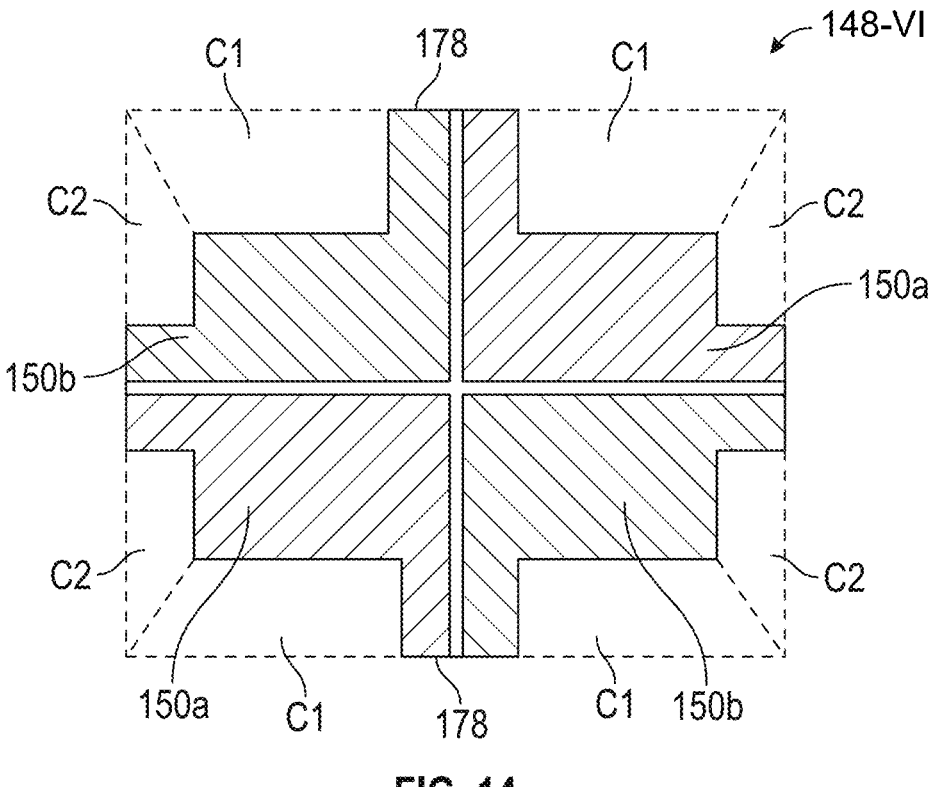
FIG. 14 is a schematic view of an exemplary rectangular piezoelectric element of an ultrasonic motor.

However, other shapes for piezoelectric element 148 can be used, even if they are not symmetrical in the horizontal and vertical orientations. For example, referring to FIG. 11, a rhombus piezoelectric element 148-III can be used. In this case, Δf is a function of C1 and C2. Referring to FIG. 12, a kite piezoelectric element 148-IV with two contact tip mounting surfaces 178 can be used. In this case, Δf is a function of C1, C2 and C3. Referring to FIG. 13, a kite piezoelectric element 148-V with a single contact tip mounting surface 178 can be used. In this case, Δf is a function of C1 and C2. Referring to FIG. 14, a rectangular piezoelectric element 148-VI can be used. In this case, Δf is a function of C1 and C2. Other shapes can also be used, such a trapezoid. Particularly suitable shapes are those that are dividable into four roughly equivalent quadrants for electrodes 150 and those that are symmetrical about a vertical center line as illustrated.

In an exemplary embodiment, the driving frequency is about 100 KiloHertz (KHz). The motion trajectory 156 of contact tip 152 can be controlled by the amplitude and/or frequency of the electrical voltage drive signals. The term "ultrasonic" means that the frequency of oscillation lies outside of the audible frequency range for humans. Thus, the ultrasonic piezoelectric actuator motor 148 operates noiselessly. Additional advantages of an ultrasonic piezoelectric actuator motor over other types of actuators include low mass, small size, case of assembly, low power consumption, and low heat generation, which are obtainable by its operation at resonance, which is energetically more favorable than quasi-static operation.

In addition to moving the head end of the head stack assembly 138 to align a head 102 with a desired track 114, the slight movements of actuator arm 122 under motive of the piezoelectric element 148 can also be used to place the head 102 precisely with respect to a surface of disk 104, with finer motion gradations than can be achieved with a conventional voice coil motor. This feature allows the exemplary data storage device 100 to read data with increased track per inch (TPI) capability.

Exemplary, non-limiting embodiments of a data storage device are described. In one embodiment, a data storage device 100 comprises a stack of data storage disks 104 mounted on a spindle 106, a first head stack assembly 138a, and a first piezoelectric motor 110a. The stack of data storage disks comprises first plurality of disks 104. The first head stack assembly 138a comprises a first arm 122, a first load beam 120, a first head 102 and a first tail 154a. The first arm 122 is configured for pivotal motion about a longitudinal axis 126 of an actuator shaft 124. The first load beam 120 is attached to the first arm 122. The first head 102 is attached to the first load beam 120, wherein the first head 102 is configured to interact with a surface of one of the first plurality of disks 104, the surface defining an x-y plane. The first tail 154a is disposed on an opposite side of the actuator shaft 124 from the first arm 122, and the first tail 154a has a first engagement surface that is parallel to the x-y plane. The first piezoelectric motor 110a comprises a first piezoelectric element 148a and a first contact tip 152a. The first piezoelectric element 148a comprises a first mounting surface 178. The first contact tip 152a is disposed at the first mounting surface 178, wherein the first contact tip 152a is configured to frictionally contact the first engagement surface 154a to pivot the first head stack assembly 138a about the longitudinal axis 126.

In an exemplary embodiment, four electrodes 150 are arranged on a respective four quadrants of the first piezoelectric element 148. In an exemplary embodiment, the first piezoelectric element 148a is configured as a diamond having four corners. The first contact tip 152a is disposed at one of the four corners, wherein the first contact tip 152a is configured to frictionally contact the first engagement surface 154a to pivot the first head stack assembly 138a about the longitudinal axis 126.

In an exemplary embodiment, the first head stack assembly 138a comprises an E-block 112 attached to a plurality of arms 122, of which the first arm 122 is one of the plurality of arms 122. In an exemplary embodiment, the data storage device 100 comprises a crash stop 118 configured as a vertical column and configured to contact a side surface of the first tail 154a. In an exemplary embodiment, the crash stop 118 comprises a lower ring 172, an upper ring 172, and a pin 170 having opposed ends inserted into the lower and upper rings 172.

In an exemplary embodiment, the first piezoelectric motor 110a comprises a first base 158a comprising a recess or opening 160 surrounding another of the four corners. In an exemplary embodiment, first and second plates 142 are disposed on opposed first and second sides of the first piezoelectric element 148 and are attached to the first base 158a. In an exemplary embodiment, a first plurality of steel springs 146 connect the first plate 142 to a first perimeter of the first side of the piezoelectric element 148. In an exemplary embodiment, a second plurality of steel springs 146 connect the second plate 142 to a second perimeter of the second side of the piezoelectric element 148.

In an exemplary embodiment, the first base 158a comprises first and second opposed end flanges 164, each of the end flanges 164 comprising a respective first or second aperture 162. In an exemplary embodiment, the data storage device 100 comprises first and second posts 166a to which the first base 158a is attached, via first and second fasteners 161 disposed through the first and second apertures 162.

In an exemplary embodiment, the data storage device 100 comprises a second plurality of disks 104 of the stack of data storage disks 104, a second head stack assembly 138b and a second piezoelectric motor 110b. The second head stack assembly 138b comprises a second arm 122, a second load beam 120, a second head 102, and a second tail 158b. The second arm 122 is configured for pivotal motion about the longitudinal axis 126. The second load beam 120 is attached to the second arm 122. The second head 102 is attached to the second load beam 120, and the second head 102 is configured to interact with a surface of one of the second plurality of disks 104. The second tail 154b is disposed on an opposite side of the actuator shaft 124 from the second arm 122, and the second tail 154b has a second engagement surface that is parallel to the x-y plane. In an exemplary embodiment, the second piezoelectric motor 110b is disposed next to the first piezoelectric motor 110a. The second piezoelectric motor 110b is configured to frictionally contact the second engagement surface 154b to move the second head stack assembly 138b.

In an exemplary embodiment, the second piezoelectric motor 110b comprises a second piezoelectric element 148b configured as a diamond and a second contact tip 152b, wherein the second contact tip 152b is configured to frictionally contact the second engagement surface 154b. In an exemplary embodiment, a first distance between the first contact tip 152a and the longitudinal axis 126 is longer than a second distance between the second contact tip 152b and the longitudinal axis 126. In an exemplary embodiment, the first contact tip 152a is positioned below the first engagement surface 154a, and the second contact tip 152b is positioned above the second engagement surface 154b.

In an exemplary embodiment, the second piezoelectric motor 110b comprises a second base 158b, and the second base 158b is longer than the first base 158a. In an exemplary embodiment as shown in FIG. 3, the first base 158a is positioned at a bottom of the first piezoelectric element 148a, and the second base 158b is positioned at a top of the second piezoelectric element 148b. In an exemplary embodiment as shown in FIG. 5, the first base 158a comprises first and second opposed end flanges 164, each of the first and second end flanges 164 comprising a respective first or second aperture 162; and the second base 158b comprises third and fourth opposed end flanges 164, each of the third and fourth end flanges 164 comprising a respective third or fourth aperture 162. In an exemplary embodiment, the data storage device 100 comprises first and second posts 166a to which the first base 158a is attached, via first and second fasteners 161 disposed through the first and second apertures 162; and third and fourth posts 166b to which the second base 158b is attached, via third and fourth fasteners 161 disposed through the third and fourth apertures 162. In an exemplary embodiment, a first distance between the first and second posts 166a is shorter than a second distance between the third and fourth posts 166b. In an exemplary embodiment, a first distance between the first post 166a and the longitudinal axis 126 is longer than a second distance between the third post 166b and the longitudinal axis 126.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent documents mentioned in the description are incorporated by reference.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A data storage device comprising:
a stack of data storage disks mounted on a spindle, the stack comprising a first plurality of disks;
a first head stack assembly comprising:
a first arm configured for pivotal motion about a longitudinal axis of an actuator shaft,
a first load beam attached to the first arm;
a first head attached to the first load beam, wherein the first head is configured to interact with a surface of one of the first plurality of disks, the surface defining an x-y plane; and
a first tail disposed on an opposite side of the actuator shaft from the first arm, the first tail having a first engagement surface that is parallel to the x-y plane; and
a first piezoelectric motor comprising:
a first piezoelectric element comprising a first mounting surface; and
a first contact tip disposed at the first mounting surface, wherein the first contact tip is configured to frictionally contact the first engagement surface to pivot the first head stack assembly about the longitudinal axis.

2. The data storage device of claim 1, comprising four electrodes arranged on a respective four quadrants of the first piezoelectric element.

3. The data storage device of claim 1 comprising a crash stop configured as a vertical column and configured to contact a side surface of the first tail.

4. The data storage device of claim 3, wherein the crash stop comprises a lower ring, an upper ring, and a pin having opposed ends inserted into the lower and upper rings.

5. The data storage device of claim 1, wherein the first piezoelectric motor comprises a first base comprising a recess, wherein the recess is configured to accommodate a corner of the first piezoelectric element that is opposite the first contact tip.

6. The data storage device of claim 5 comprising first and second plates:
disposed on opposed first and second sides of the first piezoelectric element; and
attached to the first base.

7. The data storage device of claim 6 comprising a first plurality of steel springs connecting the first plate to a first perimeter of the first side of the piezoelectric element.

8. The data storage device of claim 7 comprising a second plurality of steel springs connecting the second plate to a second perimeter of the second side of the piezoelectric element.

9. The data storage device of claim 5, wherein the first base comprises first and second opposed end flanges, each of the end flanges comprising a respective first or second aperture.

10. The data storage device of claim 9 comprising first and second posts to which the first base is attached, via first and second fasteners disposed through the first and second apertures.

11. The data storage device of claim 1, comprising:
a second plurality of disks of the stack of data storage disks; and
a second head stack assembly comprising:
a second arm configured for pivotal motion about the longitudinal axis,
a second load beam attached to the second arm;
a second head attached to the second load beam, wherein the second head is configured to interact with a surface of one of the second plurality of disks; and
a second tail disposed on an opposite side of the actuator shaft from the second arm, the second tail having a second engagement surface that is parallel to the x-y plane; and
a second piezoelectric motor disposed next to the first piezoelectric motor, wherein the second piezoelectric motor is configured to frictionally contact the second engagement surface to move the second head stack assembly.

12. The data storage device of claim 11, wherein the second piezoelectric motor comprises:
a second piezoelectric element comprising a second mounting surface; and
a second contact tip disposed at the second mounting surface, wherein the second contact tip is configured to frictionally contact the second engagement surface.

13. The data storage device of claim 12, wherein a first distance between the first contact tip and the longitudinal axis is longer than a second distance between the second contact tip and the longitudinal axis.

14. The data storage device of claim 12, wherein:
the first contact tip is positioned below the first engagement surface; and
the second contact tip is positioned above the second engagement surface.

15. The data storage device of claim 11, wherein the second piezoelectric motor comprises a second base, and wherein the second base is longer than the first base.

16. The data storage device of claim 12, wherein the second piezoelectric motor comprises a second base, and wherein:
the first base is positioned at a bottom of the first piezoelectric element; and
the second base is positioned at a top of the second piezoelectric element.

17. The data storage device of claim 11, wherein the second piezoelectric motor comprises a second base, and wherein:
the first base comprises first and second opposed end flanges, each of the first and second end flanges comprising a respective first or second aperture; and

the second base comprises third and fourth opposed end flanges, each of the third and fourth end flanges comprising a respective third or fourth aperture.

18. The data storage device of claim 17 comprising:

first and second posts to which the first base is attached, via first and second fasteners disposed through the first and second apertures; and third and fourth posts to which the second base is attached, via third and fourth fasteners disposed through the third and fourth apertures.

19. The data storage device of claim 18, wherein a first distance between the first and second posts is shorter than a second distance between the third and fourth posts.

20. The data storage device of claim 18, wherein a first distance between the first post and the longitudinal axis is longer than a second distance between the third post and the longitudinal axis.

* * * * *